(12) United States Patent
Stracquadaini

(10) Patent No.: US 9,374,009 B2
(45) Date of Patent: Jun. 21, 2016

(54) CIRCUITS AND METHODS FOR CONSTANT OUTPUT CURRENT IN A FLYBACK CONVERTER

(71) Applicant: Texas Instruments Incorporated, Dallas, TX (US)

(72) Inventor: Rosario Stracquadaini, Vittoria (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 73 days.

(21) Appl. No.: 13/910,897

(22) Filed: Jun. 5, 2013

(65) Prior Publication Data

US 2014/0362610 A1 Dec. 11, 2014

(51) Int. Cl.
 *H02M 3/335* (2006.01)
 *H02M 1/00* (2007.01)

(52) U.S. Cl.
 CPC ...... *H02M 3/33507* (2013.01); *H02M 3/33523* (2013.01); *H02M 2001/0009* (2013.01)

(58) Field of Classification Search
 USPC .......... 363/21.01, 21.05, 21.06, 21.12, 21.13, 363/21.1, 21.09, 21.08, 21.04, 18, 19, 20, 363/97
 See application file for complete search history.

(56) References Cited

U.S. PATENT DOCUMENTS

| | | | | |
|---|---|---|---|---|
| 5,841,643 A * | 11/1998 | Schenkel | ................... | 363/21.13 |
| 6,385,059 B1 * | 5/2002 | Telefus et al. | ............... | 363/21.15 |
| 7,265,999 B2 * | 9/2007 | Murata et al. | .................... | 363/16 |
| 7,542,308 B2 * | 6/2009 | Yamada | ..................... | 363/21.01 |
| 7,643,313 B2 * | 1/2010 | Lin | ................................. | 363/20 |
| 7,835,164 B2 * | 11/2010 | Lyle, Jr. | .......................... | 363/24 |
| 8,081,495 B2 * | 12/2011 | Vecera et al. | ............... | 363/21.12 |
| 8,120,931 B2 * | 2/2012 | Chang et al. | ............... | 363/21.07 |
| 8,149,601 B2 * | 4/2012 | Xiaowu et al. | ............. | 363/21.12 |
| 8,159,846 B2 * | 4/2012 | Kawabe et al. | ................. | 363/97 |
| 2007/0041228 A1 * | 2/2007 | Fang et al. | ...................... | 363/50 |
| 2007/0091651 A1 * | 4/2007 | Jang | ............................. | 363/21.01 |
| 2011/0116287 A1 * | 5/2011 | Huang et al. | ............... | 363/21.13 |
| 2012/0134707 A1 * | 5/2012 | Inukai | ............................. | 399/88 |
| 2013/0058135 A1 * | 3/2013 | Marino | ..................... | 363/21.02 |
| 2013/0077358 A1 * | 3/2013 | Gaknoki et al. | ........... | 363/21.17 |

OTHER PUBLICATIONS

LNK603-606/613-616 LinkSwitch-II Family, Energy-Efficient, Accurate CV/CC Switcher for Adaptors and Chargers, Power Integrations, www.powerint.com, Jan. 2010, pp. 18.
ALTAIR05T-800, Off-line all-primary-sensing switching regulator, www.st.com, Oct. 2010, Doc ID 17957 Rev 1, pp. 28.

* cited by examiner

*Primary Examiner* — Timothy J Dole
*Assistant Examiner* — Bryan R Perez
(74) *Attorney, Agent, or Firm* — William B. Kempler; Frank D. Cimino

(57) ABSTRACT

Flyback converters are disclosed herein. An embodiment of a flyback converter includes a transformer having a primary side and a secondary side. A switch is connected to the primary side of the transformer, wherein the switch controls the current in the primary side of the transformer. A resistance is connected between the switch and a common node. The converter also includes a comparator having a first input and a second, the first input being connected between the switch and the resistor. Driver logic controls the state of the switch, wherein the output of the comparator is coupled to the driver logic. A voltage source is connected to the second input of the comparator. An error amplifier compares the voltage at the second input of the comparator to an adjustment voltage, the output of the error amplifier is coupled to the driver logic.

17 Claims, 3 Drawing Sheets

CIRCUITS AND METHODS FOR CONSTANT OUTPUT CURRENT IN A FLYBACK CONVERTER

BACKGROUND

Many devices, such as light-emitting diode drivers and battery chargers use flyback converters as current sources. A flyback converter converts an input voltage to a constant current source using a transformer. By controlling the current flow in the primary side of the transformer (sometimes referred to as primary current), the output current is regulated. A switch controlled by a controller and connected to the primary side of the transformer controls the primary current. The controller may use pulse width modulation (PWM) to control the on time and off time of the switch.

In new applications, greater current regulation is required, which requires greater control of the switching time. One limitation in the control of the primary current is the propagation delay when the controller turns the switch off. The propagation delay may cause the switch to stay on longer than it was intended, which causes greater peak current on the primary side of the transformer. Moreover, the additional value of the peak current is also dependent on the line voltage and the primary inductance value of the transformer. In summary, the output current is greater than intended and it is dependent on other parameters that are not fully under control.

SUMMARY

Flyback converters are disclosed herein. An embodiment of a flyback converter includes a transformer having a primary side and a secondary side. A switch is connected to the primary side of the transformer, wherein the switch controls the current in the primary side of the transformer. A resistance is connected between the switch and a common node. The converter also includes a comparator having a first input and a second, the first input being connected between the switch and the resistor. Driver logic controls the state of the switch, wherein the output of the comparator is coupled to the driver logic. A voltage source is connected to the second input of the comparator. An error amplifier compares the voltage at the second input of the comparator to an adjustment voltage, the output of the error amplifier is coupled to the driver logic.

DETAILED DESCRIPTION

Figure 1:
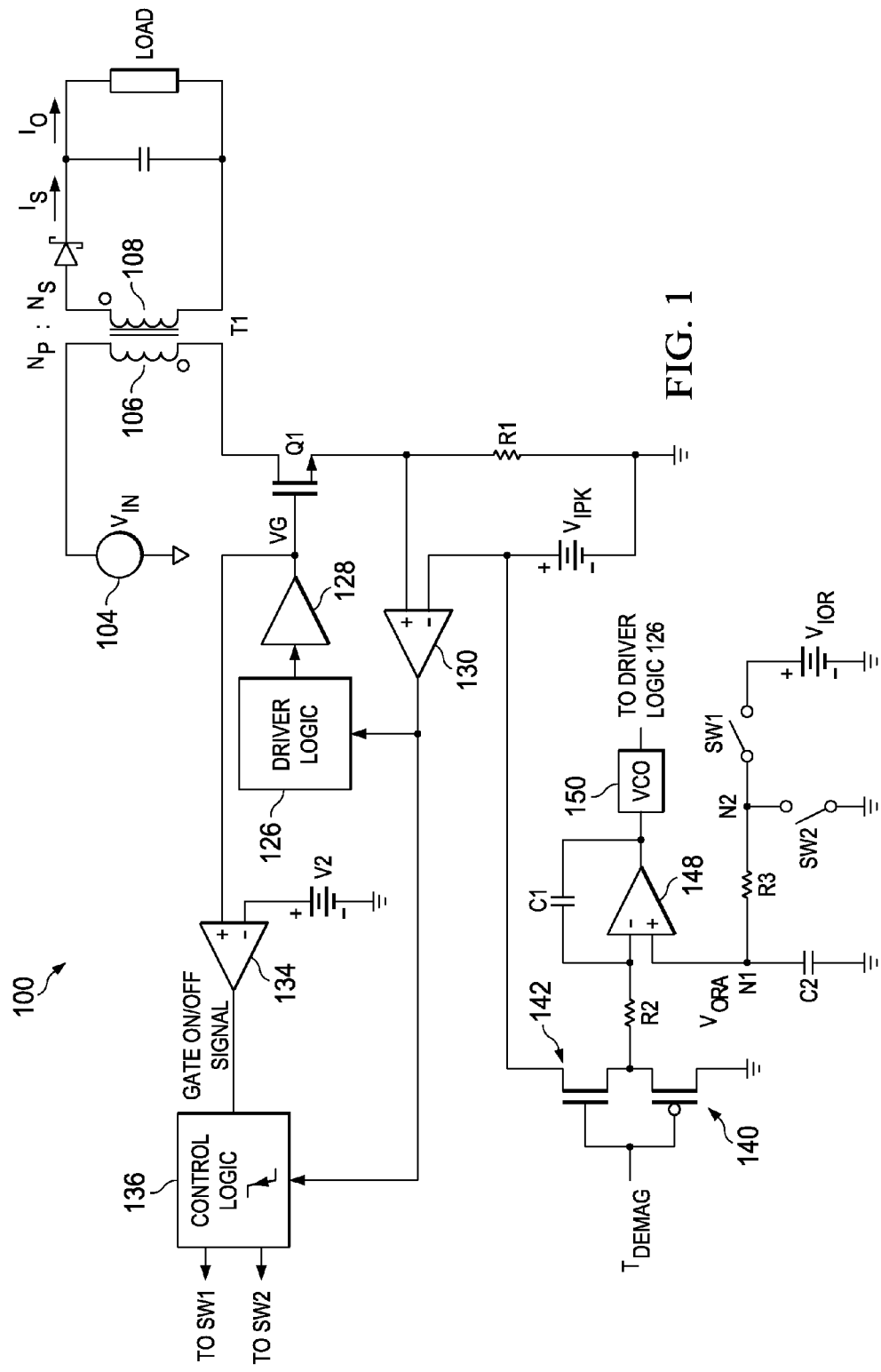
FIG. 1 is a schematic diagram of an embodiment of a flyback converter.

Referring to FIG. 1, a flyback converter 100, sometimes referred to herein simply as a converter 100, is disclosed herein. In summary, the flyback converter 100 converts an input voltage $V_{IN}$ from a voltage source 104 to an output current $I_O$ by use of a transformer T1. The input voltage $V_{IN}$ is applied to the primary side 106 of the transformer T1. The output current $I_O$ is the average value of $I_S$, which is the current flowing on the secondary side 108 or secondary windings of the transformer T1. In flyback converters, the peak current flow through the primary side 106 of the transformer T1 is proportional to the peak current flow through the secondary side 108 of the transformer T1. The converter 100 controls the output current $I_O$ by regulating the primary peak current and the demagnetization duty cycle of the transformer T1. The demagnetization duty cycle is equal to or proportional to the ratio of the demagnetization period of the transformer to the switching period, wherein the demagnetization period is the period that current flows in the secondary side 108 of the transformer T1.

The converter 100 uses a switch connected between the primary side 106 of the transformer T1 and ground or another common potential to control the primary current. In the embodiments described herein, the switch is a transistor Q1, which may be a field effect transistor (FET). A sensing resistor R1 is located between the transistor Q1 and ground. The sensing resistor R1 generates a voltage that is proportional to the primary current. Although the resistor R1 is shown and described herein, any resistance that generates a voltage proportional to current flow may be used.

The converter 100 operates by applying the input voltage $V_{IN}$ to the primary side 106 of the transformer T1 and turning the transistor Q1 on and off to conduct the primary current through the primary side 106. In some embodiments, pulse width modulation (PWM) signals are used to control the time in which the transistor Q1 is on and off. When the transistor Q1 is on for extended periods relative to the time in which it is off, the average primary current flow is high, which causes a high output current $I_O$ from the converter 100. When the time in which the transistor Q1 is off is high relative to the time in which the transistor Q1 is on, the output current $I_O$ is relatively low.

Figure 3:
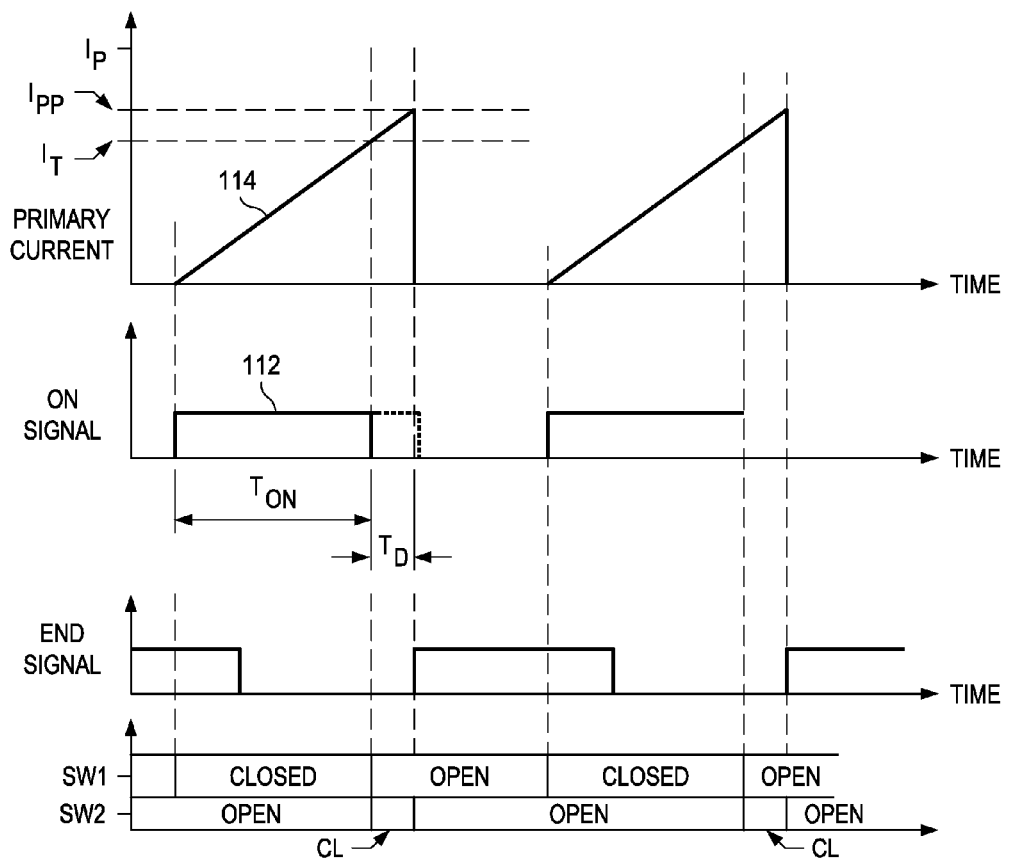
FIG. 3 is a graph showing timing signals and switch states in the flyback converter of FIG. 1.

One problem with conventional flyback converters is that there is a delay in magnetizing the primary side 106 of the transformer T1. Because the primary side 106 of the transformer T1 is a coil, it has an impedance, which is referred to as the primary magnetization or the primary impedance. The impedance is primarily inductive. Therefore, when the voltage $V_{IN}$ is a step function the primary current flow through the primary side 106 is a ramp function. The step function may be a result of the transistor Q1 turning on. In addition, a propagation delay may exist in turning the transistor Q1 off, so the primary current $I_P$ may continue to increase after a time in which it was intended to cease. More specifically, the converter 100 may generate a logic signal to control the transistor Q1. The propagation delay in the converter 100 may cause a delay between the logic signal generation and the time in which the transistor Q1 actually responds to the logic signal. An example of the logic signal is shown in FIG. 3. The logic signal is sometimes referred to as the on signal and has a period of $T_{ON}$.

Figure 2:
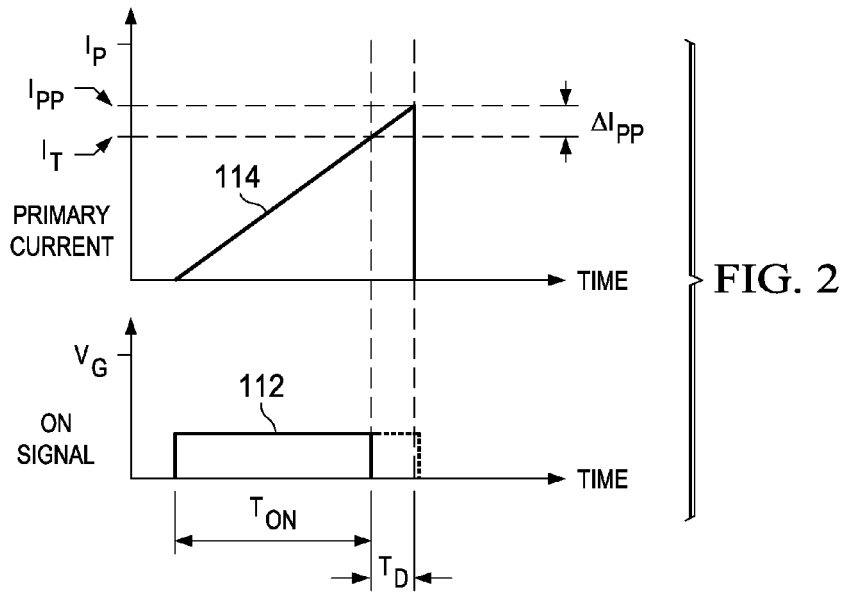
FIG. 2 is a graph showing some of the timing signals in the flyback converter of FIG. 1.

The correlation between the generation of a timing signal, which is noted as the on signal, and the primary current $I_P$ ramp function is shown in FIG. 2. More specifically, FIG. 2 shows graphs 112, 114 of the primary current $I_P$ and the on signal that is generated to control the gate voltage $V_G$ of the transistor Q1. The graph 112 shows the on signal, which as a period of $T_{ON}$, and the graph 114 shows the primary current $I_P$ flowing through the primary side 106 of the transformer T1. The primary current $I_P$ is a ramp function as shown by the graph 114 in FIG. 2. When the on signal transitions low, the transistor Q1 does not instantaneously stop conducting the primary current $I_P$. Rather, the primary current $I_P$ does not stop flowing until the period of a propagation delay $T_D$ has expired. Therefore, the primary current $I_P$ conducts for a period which is the sum of the period $T_{ON}$ of the on signal and the propagation delay $T_D$. The result is that the output current $I_O$ of the converter 100 is greater than it is intended to be.

In the embodiment of FIG. 2, the transistor Q1 is intended to be on for a period $T_{ON}$. The gate voltage of the transistor Q1 decreases during the period of the propagation delay $T_D$ and undergoes a transition from high to low. The transition between high and low states is part of the root cause of the propagation delay $T_D$. As described below, the time in which the transistor Q1 is on is extended by the propagation delay $T_D$, so the transistor Q1 conducts the primary current $I_P$ for an additional time of the propagation delay $T_D$. It is intended for the current $I_P$ to reach a target current $I_T$ during the period $T_{ON}$, however, the propagation delay causes the transistor Q1 to stay on longer, which causes the peak current to reach a value of $I_{PP}$. The slope of the primary current $I_P$ and the propagation delay $T_D$ determine the value of the current $I_{PP}$. There are many factors that affect the slope of the current $I_P$, including the input voltage $V_{IN}$ and the inductance value of the winding on the primary side 106 of the transformer T1.

The actual peak current $I_{PP}$ is greater than the target current $I_T$ by a value noted as $\Delta I_{PP}$. If the gate voltage $V_G$ was able to turn off at the end of the period $T_{ON}$, the primary current $I_P$ would have reached the value of $I_T$ and not the value $I_{PP}$. Because the peak current in the windings in the secondary side of the transformer T1 is proportional to the primary current $I_P$ multiplied by the ratio of the windings on the secondary side 108 to the windings on the primary side 106, the output current $I_O$ will overshoot its target level. The circuits controlling the transistor Q1 in the converter 100 overcome the propagation delay $T_D$ problem to achieve the target converter output current $I_O$.

The converter 100 includes driver logic 126 that controls the state of the transistor Q1 by way of a driver 128. The driver logic 126 receives an input from a comparator 130 as described below. The driver logic 126 outputs logic levels to the gate of the transistor Q1 that cause the transistor Q1 to turn off and on. The on signal, having a period of $T_{ON}$, may be generated by the driver logic 126 or other components in the converter 100. The gate voltage $V_G$ of the transistor Q1 is connected to the non-inverting input of a comparator 134. The inverting input of the comparator 134 is connected to a voltage reference V2. The value of the voltage V2 may be lower than the voltage required to keep the transistor Q1 on. Therefore, the output of the comparator 134 transitions between high and low states based on the state of the transistor Q1. The output of the comparator 134 may be an end signal described below that indicates when the primary current $I_P$ actually stops flowing. The output of the comparator 134 is connected to control logic 136, which is described in greater detail below.

The non-inverting input of the comparator 130 is connected between the source of the transistor Q1 and the resistor R1. Therefore, the voltage at the non-inverting input is the voltage across the resistor R1, which is proportional to the primary current $I_P$. The inverting side of the comparator 130 is connected to a voltage source $V_{IPK}$ and two FETs 140, 142 that function as switches. A first FET 140 has a channel that is connected to the inverting side of the comparator 130. Channels of the first and second FET 140, 142 are connected together and are coupled to an error amplifier as described below. The gates of the first and second FETS 140, 142 receive a voltage $T_{DEMAG}$. The voltage $T_{DEMAG}$ is a signal indicating that the current $I_S$ in the windings of the secondary side 108 of the transformer T1 is flowing. The voltage $T_{DEMAG}$ may be generated by a conventional auxiliary winding on the transformer T1 or other current monitoring device (not shown).

The FETs 140 are connected to the inverting side of an error amplifier 148 by way of a resistor R2. The error amplifier 148 has an integrator in its feedback, which is a capacitor C1. The non-inverting side of the error amplifier 148 is connected to a node N1. The voltage at the node N1 is referred to as the output reference adjustment voltage $V_{ORA}$. The voltage $V_{ORA}$ is adjusted by the converter 100 to offset the effects of the propagation delay $T_D$. The voltage $V_{ORA}$ is initially generated by a current output reference voltage source $V_{IOR}$. The output of the voltage source $V_{IOR}$ is connected to a switch SW1, which is connected to a node N2. A switch SW2 is connected between the node N2 and ground or a common node. Both the switches SW1 and SW2 are controlled by the control logic 136. The node N2 is connected to a low-pass filter, which in the embodiment of FIG. 1 consists of a resistor R3 and a capacitor C2. The resistor R3 may have a value of approximately 2 MΩ and the capacitor C2 may have a value of approximately 10 pf.

Having described the converter 100, its operation will now be described. The converter 100 maintains a constant output current $I_O$, even when the input voltage $V_{IN}$ to the transformer T1 varies. The switches SW1 and SW2 serve to set the voltage $V_{ORA}$ which offsets the error in the output current $I_O$ caused by the propagation delay $T_D$. Referring to FIG. 2, the following analysis of the circuit 100 is shown with and without the propagation delay $T_D$. The peak current $I_{PP}$ is defined as follows:

$$I_{PP} = I_T + \frac{V_{IN}}{L_P}T_D = \frac{V_{IPK}}{R1} + \frac{V_{IPK}}{(R1)T_{ON}}T_D \qquad \text{Equation (1)}$$

where $L_P$ is the primary inductance of the transformer T1. By factoring out $V_{IPK}$ and R1 of the second part of equation 1, the primary peak current $I_{PP}$ becomes the following:

$$I_{PP} = \frac{V_{IPK}}{R1}\left(1 + \frac{T_D}{T_{ON}}\right) \qquad \text{Equation (2)}$$

Referring to FIG. 1, it can be seen that the target current $I_T$ is equal to the voltage $V_{IPK}$ divided by the resistance R1, therefore, equation 2 can be written as:

$$I_{PP} = I_T\left(1 + \frac{T_D}{T_{ON}}\right) \qquad \text{Equation (3)}$$

As shown by equation 3, the propagation delay $T_D$ introduces an error in the primary current $I_P$. If there was no propagation delay $T_D$, the peak current $I_{PP}$ would be equal to the target current $I_T$. The error caused by the propagation delay $T_D$ transfers to the output current $I_O$, which is the average current flowing through the secondary side 108 of the transformer T1. If the propagation delay $T_D$ is zero, the output current $I_O$ is calculated as follows:

$$I_0 = \frac{1}{2}\frac{N_P}{N_S}\frac{V_{IPK}}{R_1}T_{DEMAG}f_{SW} \qquad \text{Equation (4)}$$

where $N_P$ is the number of windings on the primary side of the transformer T1, $N_S$ is the number of windings on the secondary side of the transformer T1. $T_{DEMAG}$ is the demagnetization time of the transformer or the time interval in which the current flows in the secondary winding, and $f_{SW}$ is the switching frequency of the transistor Q1. It is noted that output current $I_O$ in equation 4 is generated based on the peak current $I_{PP}$, which is the target current $I_T$ because there is no propagation delay $T_D$. The product of the demagnetization period $T_{DEMAG}$ and the switching frequency $f_{SW}$ is kept constant by the error amplifier 148. The output of the error amplifier 148 modulates the switching frequency and the output is maintained equal to $V_{ORA}/V_{IPK}$. In addition, the voltage $V_{IPK}$ is equal to the voltage $V_{IOR}$ because there is no voltage compensation at the node N1. Therefore, equation 4 can be rewritten as follows:

$$I_0 = \frac{1}{2} \frac{N_P}{N_S} \frac{V_{IOR}}{R_1} \quad \text{Equation (5)}$$

When the circuit 100 is subjected to the propagation delay $T_D$, the output reference voltage $V_{IOR}$ is affected, which changes the output current to the following:

$$I_0 = \frac{1}{2} \frac{N_P}{N_S} \frac{V_{IOR}}{R_1} \left(1 + \frac{T_D}{T_{ON}}\right) \quad \text{Equation (6)}$$

In order to cancel the error introduced by the propagation delay $T_D$, the voltage $V_{IOR}$ is replaced with the inverse of the propagation delay. The voltage $V_{ORA}$ at node N1 is changed to the following:

$$V_{ORA} = V_{IOR}\left(\frac{T_{ON}}{T_D + T_{ON}}\right) \quad \text{Equation (7)}$$

By using the voltage $V_{ORA}$ as set forth in equation 7, the effects of the propagation delay $T_D$ are cancelled. It is noted that the values of $T_{ON}$ and $T_D$ have to be monitored for every cycle in order to generate the correct voltage $V_{ORA}$. The converter 100 is able to calculate the propagation delay $T_D$ based on the period $T_{ON}$ and the end signal indicating that the primary current $I_P$ has stopped flowing. The end signal may be generated by the output of the comparator 134. If the voltage V2 is set to the gate to source voltage for transitions between off and on, the output voltage of the comparator 134 indicates whether the primary current $I_P$ is flowing. In another embodiment, the transformer T1 may have an auxiliary winding that generates a sensing voltage when the primary current $I_P$ is flowing. The control logic 136 may monitor the sensing voltage to determine if the primary current $I_P$ is flowing. An auxiliary winding may also be used to determine if the current is flowing in the windings on the secondary side 108 of the transformer T1, which may be used to generate the $T_{DEMAG}$ voltage.

The converter 100 changes the states of the switches SW1 and SW2 to generate the voltage $V_{ORA}$. In doing so, the converter 100 is able to maintain a constant output current $I_O$ irrespective of changes to the input voltage $V_{IN}$. Reference is made to FIG. 3, which is a chart showing the states of the switches SW1 and SW2 relative to the primary current $I_P$, the on signal generated to drive the gate of the transistor Q1, and an end signal having a period $T_{END}$. When the primary current $I_P$ starts to rise, the switch SW1 closes and the switch SW2 is open. At the time where the on signal transitions to logic zero, the switch SW1 opens and the switch SW2 closes. During this time, the driver logic 126 has transitioned the on signal to turn the transistor Q1 off, but the primary current $I_P$ is still flowing. The switch SW1 remains open until the on signal transitions to a logic one. At the end of the propagation delay $T_D$, noted by a transition in the end signal, the switch SW2 opens and remains open until the on signal transitions to zero again. In summary, during the propagation delay $T_D$, the switch SW2 is closed and the switch SW1 is open, which drops the voltage $V_{ORA}$.

Referring to equation 7, the voltage $V_{ORA}$ at node N1 cancels the effect of the propagation delay $T_D$ so that the output current $I_O$ remains substantially constant. The voltage $V_{ORA}$ sets the voltage which the error amplifier 148 uses to generate the output. The error amplifier 148 outputs a voltage so that the inverting and non-inverting inputs are equal. The output of the error amplifier 148 may be input to a voltage controlled oscillator (VCO) 150, which changes the switching frequency $f_{SW}$ of the transistor Q1 to offset the propagation delay per equation 4. The result is a constant output current $I_O$ that is not affected by the propagation delay. In other embodiments, the signal generated by the error amplifier 148 may control other portions of the circuit 100 in order to equalize the inverting and non-inverting inputs.

Figure 4:
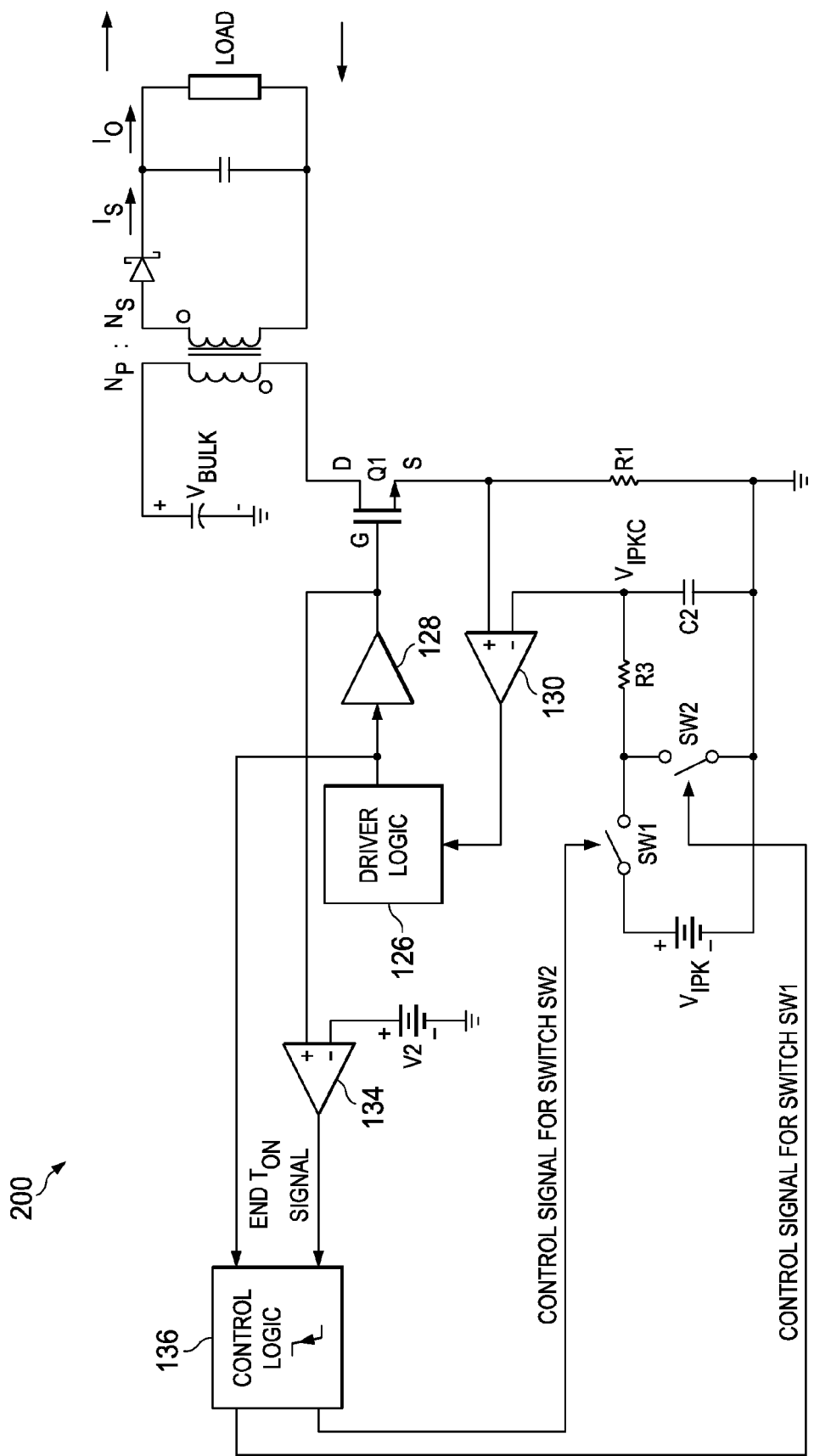
FIG. 4 is schematic diagram of another embodiment of a flyback converter.

Another embodiment of a flyback converter 200 is shown in FIG. 4. The converter 200 includes many of the same components as the converter 100 of FIG. 1, however, the components are configured differently. Instead of generating the voltage $V_{ORA}$ based on the voltage $V_{IOR}$, the converter 200 generates a voltage that is the compensated voltage $V_{IPK}$, which is referred to as the voltage $V_{IPKC}$. The voltage $V_{IPKC}$ is calculated as follows:

$$V_{IPKC} = V_{IPK}\left(\frac{T_{ON}}{T_{ON} + T_D}\right) \quad \text{Equation (8)}$$

The converter 200 generates the voltage $V_{IPKC}$ and feeds the voltage $V_{IPKC}$ to the inverting input of the comparator 130. The voltage $V_{IPKC}$ may be generated by the switches SW1 and SW2 in the same manner that the voltage $V_{ORA}$ is generated.

In some embodiments of either converter 100 or 200, the primary current IP may not form a perfect ramp function. Rather, the peak of the ramp may be rounded or otherwise cut off. This may present problems in measuring the propagation delay $T_D$. For example, if the propagation delay $T_D$ is measured based on the primary current IP, the rounded peak will make the measurement inaccurate. In order to achieve better precision in compensating for the propagation delay $T_D$, the state of the switches may be set to indicate no propagation delay on select cycles of the primary current $I_P$. More specifically, some cycles are not compensated, therefore, in those cycles, the switch SW2 is left open and the switch SW1 is closed. The number of cycles that are not compensated may be a design choice.

The reduction in compensating for the propagation delay TD may be achieved by using a shift register that controls the states of the switches. The output of the shift register is fed back to its input so that the same sequence of bits is cycles through the shift register. For example, when a bit controlling the switch SW2 is a one, the compensation proceeds, if the bit is a zero, the switch SW2 cannot be closed and there is no compensation.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A flyback converter comprising:
a transformer having a primary side and a secondary side, wherein the primary side is connectable to a voltage source;
a first switch connected to the primary side of the transformer, the first switch controlling the current in the primary side of the transformer;
a current sensor resistance connected between the first switch and a common node;
a comparator having a first input and a second, the first input being connected between the switch and the current sensor;
driver logic that controls the state of the first switch, wherein the output of the comparator is coupled to the driver logic;
a first voltage source being connected to the second input of the comparator;
an error amplifier that is coupled to the voltage at the inverting input of the comparator to an adjustment voltage, the output of the error amplifier being coupled to the driver logic, wherein the adjustment voltage compensates for a propagation delay time between the time the controller generates a control signal for the switch and the time in which current in the primary side of the transformer ceases to flow, wherein output from the converter is regulated to achieve high current accuracy, wherein an open loop adjustment voltage is generated by a circuit comprising:
a voltage source referenced to the common node;
a second switch connected between the voltage source and a node; and
a third switch connected between the node and the common node;
wherein the node is coupled to the error amplifier.

2. The flyback converter of claim 1 wherein the output of the error amplifier drives a voltage controlled oscillator, the output of the voltage controlled oscillator being input to the driver logic.

3. The flyback converter of claim 1, wherein the adjustment voltage is generated based on a logic signal generated to control the first switch.

4. The flyback converter of claim 1, wherein the adjustment voltage is generated based on the time at which the first switch transitions between a closed state and an open state.

5. The flyback converter of claim 1 and further comprising a low pass filter connected between the node and the error amplifier.

6. The flyback converter of claim 1, wherein the states of the switches are dependent on the period of a signal generated to operate the first switch and the actual state of the first switch.

7. The flyback converter of claim 1, wherein a propagation delay exists between the generation of a control signal by the driver logic that controls the state of the first switch and the current flow through primary side of the transformer, wherein the second switch is open during the propagation delay and wherein the third switch is closed during the propagation delay.

8. The flyback converter of claim 1 wherein the error amplifier compensates for propagation delay in the flyback converter, wherein the input to the transformer is substantially cyclical, and wherein compensation for propagation delay is disabled during predetermined cycles of the input.

9. The flyback converter of claim 1, wherein a propagation delay exists between the generation of a control signal by the driver logic and the current flow through the primary side of the transformer and wherein the adjustment signal is proportional to the inverse of the propagation delay.

10. A flyback converter comprising:
a transformer having a primary side and a secondary side, wherein the primary side is connectable to a voltage source;
a first switch connected to the primary side of the transformer, the first switch controlling the current in the primary side of the transformer;
a resistance connected between the first switch and a common node;
a comparator having a first input and a second input, the first input being connected between the switch and the resistor;
a driver logic that controls the state of the first switch, wherein the output of the comparator is coupled to the driver logic; and
a first voltage source being connected to the second input of the comparator, the value of the first voltage being dependent on the time of a logic signal generated to control the first switch and the actual state of the first switch, wherein a propagation delay time exists between the generation of a control signal by the driver logic and the current flow through the first switch and wherein an open loop adjustment signal is proportional to the inverse of the propagation delay, wherein output from the converter is regulated to achieve high current accuracy.

11. The flyback converter of claim 10 wherein the first voltage source is generated by a second voltage source and at least one switch connected between the second voltage source and the first voltage source.

12. The flyback converter of claim 11 and further comprising a circuit that controls the states of the at least one switch connected between the second voltage source and the first voltage source based on the time of a logic signal generated to control the first switch and the actual state of the first switch.

13. The flyback converter of claim 11, wherein a first switch is coupled between the second voltage source and a node, the node being coupled to the second input of the comparator; and wherein a second switch is coupled between the node and the common node.

14. The flyback converter of claim 11 and further comprising a low pass filter connected between the at least one switch and the first voltage source.

15. The flyback converter of claim 11, wherein a propagation delay exists between the generation of a control signal by the driver logic and the current flow through the first switch, wherein the second switch is open during the propagation delay and wherein the third switch is closed during the propagation delay.

16. The flyback converter of claim 10, wherein the switch is a field effect transistor.

17. A flyback converter comprising:
a transformer having a primary side and a secondary side, wherein the primary side is connectable to a voltage source;
a transistor connectable to the primary side of the transformer, the transistor controlling the current in the primary side of the transformer;
a resistance couplable between the transistor and ground;
a comparator having an inverting input and a non-inverting input, the non-inverting input being connected between the transistor and the resistance;

a driver logic that controls the state of the transistor, wherein the output of the comparator is coupled to the driver logic;

a first voltage source being connected to the inverting input of the comparator; and an error amplifier that compares the voltage at the inverting input of the comparator to an adjustment voltage, the output of the error amplifier being coupled to the driver logic;

wherein a propagation delay time exists between the generation of a control signal by the driver logic and the current flow through the first switch and wherein an open loop adjustment signal is the inverse of the propagation delay and wherein output from the converter is regulated to achieve high current accuracy.

* * * * *